Nov. 1, 1938.    H. R. CRAGO    2,135,300
SELECTIVE CONTROL FOR AIR CONDITIONING APPARATUS
Filed June 26, 1936
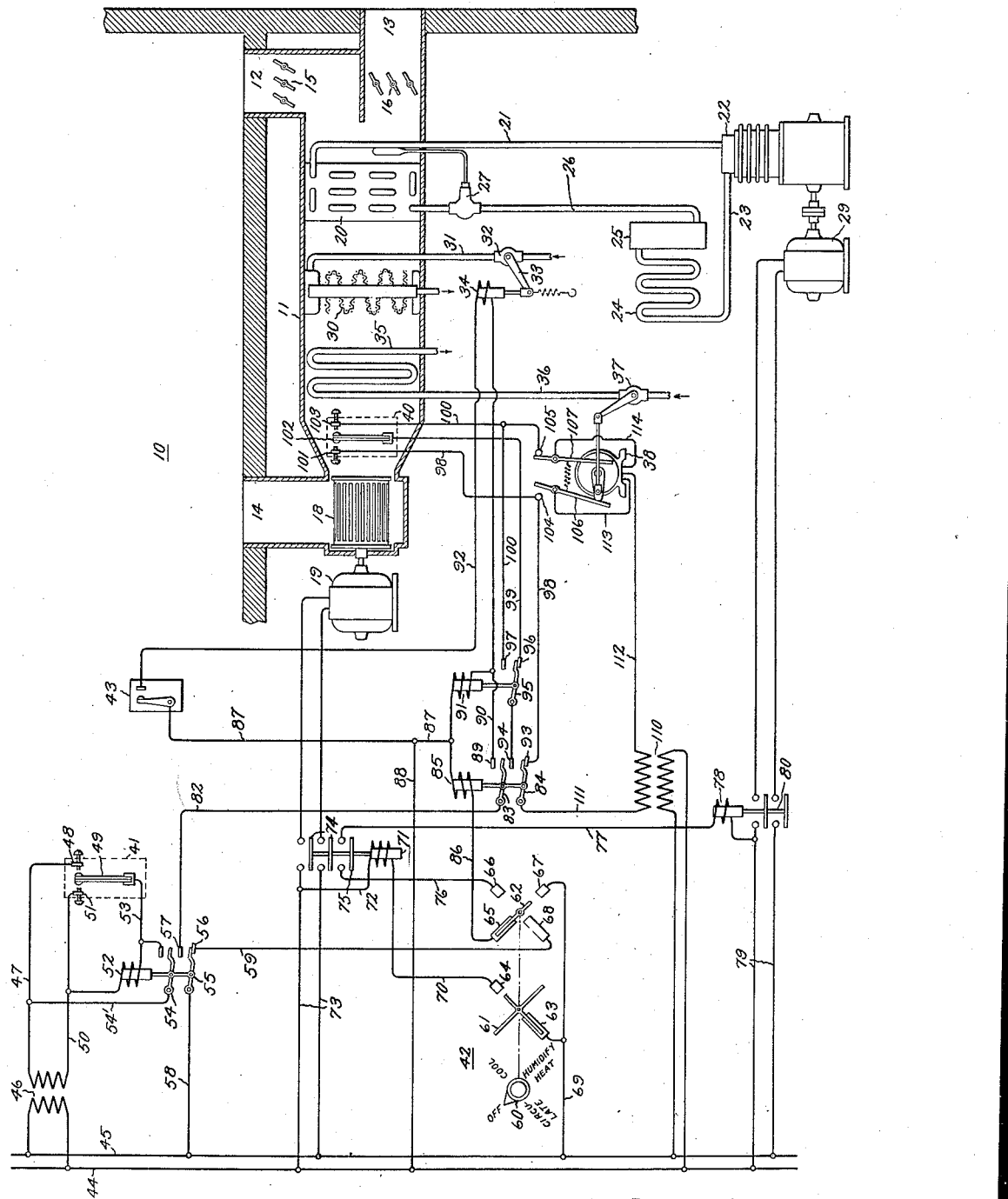
Inventor:
Harry R. Crago,
by Harry E. Dunham
His Attorney.

Patented Nov. 1, 1938

2,135,300

UNITED STATES PATENT OFFICE 2,135,300

SELECTIVE CONTROL FOR AIR-CONDITIONING APPARATUS

Harry R. Crago, Caldwell, N. J., assignor to General Electric Company, a corporation of New York Application June 26, 1936, Serial No. 87,484

10 Claims. (Cl. 236—1)

My invention relates to a control for air conditioning apparatus and more particularly to improvements in control of the type in which the several air conditioning functions to be performed by the apparatus are under a selective control.

A control of the above type is disclosed in an application of Edward W. Roessler, Serial No. 32,758, filed July 23, 1935 and assigned to the assignee of the present application. In this application is disclosed a year around air conditioning apparatus having means for circulating, heating, cooling and humidifying the air to be supplied to any space that is to be conditioned. A selector switch is provided for the selection of proper apparatus during the different seasons of the year and a single thermal responsive means located in the space to be conditioned is interconnected with said selector switch to control the operation of the selected apparatus.

When heating and cooling apparatus utilizing both fresh and recirculated air, provided with control of the type outlined above, is placed in operation with the heating apparatus functioning there is an objectionable alternate blowing of heated and unheated air upon persons in the near vicinity of the discharge duct. This objectionable result is more noticeable when the temperature outdoors is low and the temperature differential between the heated and unheated air greater.

It is therefore a principal object of my invention to provide a control of the type described above with a secondary thermal responsive means located adjacent to or in the vicinity of the heating means which is selectively brought into operation for the purpose of preventing the temperature of the air discharged from the conditioner from falling below a certain minimum value.

It is a further object of my invention so to correlate the primary and secondary control of the heating means by the space thermal responsive means and the thermal responsive means located adjacent the heater that the latter is prevented from controlling the heater except when the space is at or above a predetermined desirable temperature.

Another object of my invention is to provide a selected control with means whereby the thermal responsive means located adjacent the heating apparatus is prevented from exerting control over either the heating or cooling means when the cooling means is selected for operation. The heating apparatus thus is under the control of two thermal responsive means, one of which is located in the space being conditioned and the cooling means is under the sole control of the latter.

Other objects of the invention will become apparent from the ensuing description taken in conjunction with the accompanying drawing in which is set forth for the purpose of illustration the details of arrangement.

The single figure of the drawing shows diagrammatically air conditioning apparatus designed for year around operation and illustrates schematically a control system therefor embodying features of the present invention.

Referring to the figure, reference numeral 10 designates a space such as a room, building or the like to which a conditioned medium, such as air, is to be supplied. The conditioned air is supplied to the space by an air conditioner 11 preferably located without said space and provided with the usual recirculated air duct 12, a fresh air duct 13 and a discharge duct 14. The proportions of recirculated and fresh air may be controlled by dampers 15 and 16 in the recirculated and fresh air ducts, respectively, and these may be controlled either manually or automatically in response to indoor or outdoor temperature variations. The conditioner is provided also with a fan 18 positioned in the discharge duct and driven by an electric motor 19 controlled in a manner hereinafter to be described. The air drawn through the conditioner may be suitably conditioned by heating, cooling and humidifying means forming part of the conditioner and while I have shown a manually operable selector switch for selecting the apparatus described for operation my invention is not necessarily limited to such an arrangement, as will appear from the ensuing description.

The cooling means consists of the usual mechanical refrigeration apparatus comprising an evaporator, compressor, condenser, liquid receiver, and expansion valve. The evaporator 20 is connected by a refrigerant line 21 to the suction side of a compressor 22. The high pressure side of the compressor is connected by conduit 23 to a condenser 24 which may be cooled in any suitable manner. The condenser in turn is connected to a liquid receiver 25 and the latter is connected through conduit 26 to thermostatically controlled expansion valve 27 controlling the flow of refrigerant to the evaporator. The compressor is driven by a suitable prime mover such as an electrical motor 29 that is controlled in a manner hereinafter to be described.

To properly humidify the air supplied to the space 10 during seasons when heating is required, I have provided a humidifying apparatus 30, illustrated as being of the wire screen type but which may be of any desirable construction. Water is supplied to the humidifier through a conduit 31 under the control of a valve 32 having an operating arm 33 adapted to be moved from an open to closed position, and vice versa, by any suitable operating means such as the electrical solenoid 34 adapted to be energized in response to humidity conditions in the space 10.

The heating means of the conditioner is diagrammatically illustrated as a coil 35 adapted to be supplied with a suitable heating medium such as steam or hot water from any suitable source (not shown). The heating medium is supplied to the coil through a conduit 36 under the control of a motor operated valve 37. The latter is adapted to be operated between its closed and open positions by means of a motor such as an electric motor 38 of the modulating type, i. e., it may be operated not only to open and close the valve but may operate the valve to any intermediate position. It is obvious to those skilled in the art that the motor I have illustrated is but one of many types, either electric or pneumatic that may be used.

The supply of heating medium to the heating coil 35 is under the joint control of a thermal responsive means 40, or heat exchanger thermostat as it is commonly called, located in the conditioner and in the vicinity of or adjacent the heating means and a second thermal responsive means 41 located in the space being conditioned whereas the control of cooling medium to the evaporator 20 is under the sole control of the thermal responsive means 41. The selection of the function to be performed by the conditioning apparatus is under the control of a selector switch 42 having four positions to which it may be moved manually, preferably, as indicated in the figure. Thus, the conditioner may be used either to circulate, cool or to heat and humidify the air. The control arrangement, which will be described in greater detail later, is such that the humidifying means is rendered operative only when heating is selected and heating is called for by the thermal responsive means 41. Thus, when heating is selected the humidifying apparatus 30 is placed under the joint control of a humidostat 43 positioned within the space being conditioned and the space thermal responsive means.

The control circuits and the electrical apparatus of the system are provided with electrical energy from a suitable source 44—45. The space thermal responsive means, or room thermostat 41, as it will be referred to hereinafter, is provided with low voltage energy through a transformer 46. One side of the secondary winding of the transformer is connected by an electrical conductor 47 to an adjustably mounted contact 48 associated with the thermal responsive element 49 of the room thermostat 41. The other side of the secondary winding is connected by conductor 50 to a second adjustably mounted contact 51 associated with the thermal responsive element 49. The thermal responsive element 49, illustrated as a bimetallic element, is arranged to move to the right into engagement with contact 48 whenever the temperature within the zone decreases below a predetermined minimum value and into engagement with contact 51 when the temperature rises above a predetermined maximum value. When the temperature falls below the minimum value an energizing circuit for a relay 52 is closed through conductor 53 connected to the thermal responsive element 49. This relay is provided with a pair of switch arms 54 and 55, the former of which is adapted to close a holding through conductor 54' for the relay 52. The relay, once energized, remains in its closed position until the temperature within the zone 10 rises above the predetermined maximum value at which time element 49 engages contact 51 to place a short circuit across relay 52.

The second of the pair of switches controlled by the relay is adapted to control the operation of either the cooling or heating apparatus, depending upon which of these has been selected for operation. This control is effected by engagement of switch arm 55 with either of the stationary contacts 56 or 57 engageable thereby. One terminal of the switch member 55 is connected to supply conductor 45 by an electrical conductor 58. The stationary contact 56 is connected by means of conductor 59 to the manually operable selector switch 42.

The selector switch consists of a manually operable knob and indicating member 60 and a pair of rotatable switches 61 and 62 adapted to be rotated thereby. Switch 61 is adapted to close a circuit across stationary contacts 63 and 64 associated therewith in all positions of knob 60 with the exception of the off position, i. e., the illustrated position of the selector switch. Switch 62 has associated with it four stationary contacts 65, 66, 67 and 68 and it is adapted to engage contacts 66 and 68 when cooling is selected and contacts 65 and 67 when heating is selected. It may be seen from the drawing that switch 62 does not close any circuits when the selector switch is in its off or circulate positions. Thus, when the apparatus is in its off position, all of the electrical apparatus of the conditioner is deenergized.

When circulation of air alone is desired selector switch 42 is placed into its circulate position to close a circuit across contacts 63 and 64 to energize fan motor 19. The fan motor control circuit is connected across supply conductors 44 and 45 as follows: from conductor 45 through conductor 69, contact 63, switch 61, contact 64, conductor 70, relay 71, conductor 72 and thence to supply conductor 44 through one of a pair of conductors 73. Fan motor 19 is supplied with electrical energy through the last mentioned conductors upon the closure of a pair of switches 74 when relay 71 is energized. Relay 71 is also adapted to close the third switch, or interlock 75, but closure of the latter has no effect on the remaining part of the apparatus due to the fact that switch 62 does not close any electrical circuits when in the circulate position.

When cooling is selected switch 61 is rotated to connect contacts 63 and 64 and thereby close the above described energizing circuit for the fan control relay 71 and switch 62 is rotated to connect contacts 66 and 68. Closure of the circuit across the last mentioned contacts places the cooling means under the control of the room thermostat in the following manner. Supply conductor 45 is connected through conductor 58, switch 55, contact 56, conductor 59, contact 68, switch 62, contact 66 and a conductor 76 to the switch 75. From the latter an electrical conductor 77 leads to a relay 78 that is connected in turn to the other supply conductor 44 through one of a pair of conductors 79 through which energy is supplied to compressor motor 29 upon the closure of switch 80 by the relay 78.

When the selector switch 42 is turned to the heat and humidify position the heating apparatus is placed under the control of the heat exchanger thermostat 40 located adjacent the heating coil and the room thermostat 41. The control, as will appear more fully hereinafter, is such that whenever the room thermostat calls for heat the valve will be operated to a position wherein it is fully open and after the room temperature has been raised to a predetermined value the heat exchanger thermostat will control the position of the valve and maintain it at some intermediate position in order that the temperature of the air will not fall below the value determined by the setting of the heat exchanger thermostat. The humidifying apparatus is simultaneously placed under the control of the humidostat 43 and the room thermostat.

The detailed description of the circuits by means of which the conjoint control of the heating means by the two thermal responsive means is accomplished will now be given. The control is energized through a conductor 82 leading from contact 57 of the switch 55 controlled by the room thermostat to switch 83 of a pair of switches 83 and 84 controlled by a relay 85 that is adapted to be energized continuously upon selection of the heating function. The energizing circuit for this relay is from supply conductor 45 through conductor 69, contact 67, switch 62, contact 65, conductor 86 and through the winding of relay 85 and conductors 87 and 88 back to the other supply conductor 44. The single contact 89 engageable by switch member 83 is connected to a conductor 90 leading to a relay 91 and solenoid 34 controlling the supply of water to the humidifier. Solenoid 34 is connected to one terminal of humidostat through conductor 92 and the other terminal of the humidostat is connected to conductor 88 through conductor 87.

The energization of relay 91 is under the control of the room thermostat whenever relay 85 is energized because of engagement of switch 83 with contact 89. Switch 84 is operable simultaneously with operation of switch 83 from engagement with a stationary contact 93 into engagement with a stationary contact 94. Switch 95, operated upon energization of relay 91, is adapted to move from engagement with a contact 96 into engagement with a contact 97. It will be seen that switch member 95 is directly connected to contact 94 and that contacts 93, 96 and 97 are connected by conductors 98, 99, and 100 to the adjustably mounted contact 101 bimetallic element 102 and the adjustably mounted contact 103, respectively, of the heat exchanger thermostat 40. The bimetallic element is constructed to move to the left on an increase in temperature and to the right upon a decrease in temperature and according to my invention may be arranged to engage its respective contacts at temperatures either higher or lower than those at which the room thermostat engages its respective contacts. The purpose of this arrangement is to permit adjustment of the discharge air temperature to suit the user's needs. In some installations overheating may be particularly objectionable and if the discharge temperature is maintained at a value less than that at which the room thermostat operates the overheating may be avoided. In other installations or in severe cold weather it may be desirable to have the discharge temperature of the air higher than the temperature to be maintained in the room. Both results may be readily obtained by changing the adjustment of the heat exchanger thermostat. Conductors 98 and 100 are also connected with a pair of limit contacts 104 and 105 associated with a pair of motor operated limit switches 106 and 107, respectively. Limit switch 106 is illustrated in its open position, indicating the fact that the valve 37 is in its fully closed position. In the fully open position of the valve limit switch 107 is opened. Power is supplied to the heating medium valve controlling motor 38 from a transformer 110 having its primary connected to supply lines 44 and 45 and its secondary connected by conductors 111 and 112 to switch 84 and motor 38, respectively. An electrical connection 113 connects one winding of the motor to limit switches 106 and a connection 114 connects the other winding of the motor to limit switch 107.

In order that a better understanding of my invention may be had the operation thereof when various functions are selected for operation will now be described.

When the selector switch 42 is in its off position it is obvious that the apparatus will remain in the indicated position in which it is entirely inoperative. When it is desired to circulate air through space 10 the selector switch is moved in a counter-clockwise direction to the circulate position. This effects energization of relay 71 through closure of contacts 63 and 64 by switch 61. The energizing circuit has been previously described and it is obvious that energization of the relay in turn effects movement of switch 74 to energize fan motor 19 through conductors 73. As previously stated, closure of switch 75 simultaneously with closure of switch 74 does not effect any change in the remaining part of the apparatus because switch arm 62 is not in a position to energize any circuits. Thus, the fan 18 is rotated by fan motor 19 to maintain a constant circulation of air within space 10.

If conditions outdoors change making it desirable to heat the air then the selector switch 42 is rotated further in a clockwise direction to the heat and humidify position. Relay 71 is again energized in the previously described manner to effect operation of the fan and relay 85 is energized to condition the control circuits to valve motor 38, placing the latter under the joint control of the room thermostat and the heat exchanger thermostat. The energizing circuit for the relay 85 is as follows: supply conductor 45, conductor 69, contact 67, switch 62, contact 65, conductor 86, to the relay winding and thence through conductors 87 and 88 to the other supply conductor 44. Energization of the relay effects movement of switches 83 and 84 into engagement with contacts 89 and 94, respectively. Engagement of switch 83 with contact 89 conditions the circuit to relay 91 for control by the room thermostat 41. This control circuit for the relay 91 is as follows: from supply conductor 45 through conductor 58, switch 55 when the latter engages the upper stationary contact 57 engageable thereby, conductor 82, switch 83 in engagement with contact 89, conductor 90 to the relay winding 91 and thence through conductors 87 and 88 to the other supply conductor 44. Thus, whenever switch element 55 is moved into its upper position, as it will whenever the temperature within space 10 falls below a predetermined minimum value, relay 91 is energized.

Assuming that the temperature within space 10 has a value below a predetermined minimum value then relay 52 is energized by engagement of thermal element 49 with its associated contact 48 through a previously described circuit.

Relay 91 is thereby energized by closure of the circuit just described and effects movement of switch 95 from engagement with contact 96 into engagement with contact 97. Remembering that switch 84 is in engagement with contact 94 it will be seen that the motor 38 is thereby energized to fully open valve 37. The energizing circuit for the motor is as follows: secondary winding of the transformer 110 through conductor 111, switch 84 in engagement with contact 94, switch 95 in engagement with contact 97, conductor 100, limit contact 105 and limit switch 107 in engagement therewith, conductor 114 to the opening winding of motor 38 and from the latter to the other side of the secondary winding through the common conductor 112. Upon rotation of the motor 180° and opening of the valve 37, limit switch 107 is moved out of engagement with contact 105 to deenergize the motor. In the meantime, upon initial opening movement of the valve, limit switch 106 was closed to condition the valve motor for the next operation thereof, in a closing direction, upon attainment of proper temperature conditions in the room and conditioner.

As previously stated, the heat exchanger thermostat element may be set to operate at or maintain a temperature either higher or lower than the room temperature. Assuming that it is set to maintain a temperature lower than that to be maintained in the room it will be seen that it will be in contact with its high side, contact 101, at the time relay 91 is energized by the room thermostat. However, this engagement will effect no operation because the motor 38 has previously operated valve 37 to its closed position and limit switch 106 is open, as indicated in the figure. After the above-described opening of valve 37 and admission of steam to the heating element the thermal responsive element 102 will remain in engagement with contact 101 but, again, no operation will result because the circuit therethrough is broken at contact 96. If the temperature within the room now increases to its predetermined maximum value the motor 38 will be placed under the control of the heat exchanger thermostat in the following manner. Upon the occurrence of the maximum temperature in the space relay 52 is deenergized by closure of a short circuit therearound by engagement of thermal responsive element 49 with contact 51. Switches 54 and 55 move to their lowermost positions and effect opening of the holding circuit for relay 52 and deenergization of relay 91, respectively. Deenergization of the latter effects movement of switch 95 into engagement with contact 96. This closes an energizing circuit for the motor 38 leading from the secondary winding of the transformer through conductor 111, switch 84 in engagement with contact 94, switch 95 now in engagement with contact 96, conductor 99, thermal responsive element 102 in engagement with contact 101, conductor 98 to contact 104, limit switch 106 in engagement therewith, conductor 113 to the closing winding of motor 38, and from the latter to the secondary winding of the transformer through conductor 112.

With the room temperature above the predetermined maximum value, the supply of heating medium to the heating means thus is placed under the sole control of the heat exchanger thermostat. Since it has been assumed that the latter is in engagement with its contact 101, i. e., in its "hot" position (because it is adapted to maintain a temperature lower than that maintained by the room thermostat), the valve will be operated toward its closed position as long as the closing winding of the motor is energized through the above described circuit. After the temperature of the air within the conditioner decreases to the predetermined minimum value, thermal responsive element 102 engages its cold contact 103 and closes a circuit to energize the opening winding of motor 38. The valve is then opened and heating medium is admitted to the heating means of the conditioner. The energizing circuit for the opening winding is as follows: from the secondary winding of transformer 110, conductor 111, switch 84 in engagement with contact 94, switch 95 in engagement with contact 96, conductor 99, thermal responsive element 102 in engagement with contact 103, conductor 100, contact 105, limit switch 107 in engagement with contact 105, conductor 114 to the opening winding of motor 38 and from the latter by conductor 112 to the secondary winding of the transformer. Thus, the valve 37 is again opened until the temperature surrounding the heat exchanger thermostat rises to a predetermined maximum value when upon engagement of thermal responsive element 102 with its contact 101 the motor will again be deenergized in the manner described above to effect closure of the valve. The heat exchanger thermostat may be constructed so that it will operate from one contact to the other with a snap action or gradually. In the latter arrangement, as illustrated in the figure, the element 102 may be in a position intermediate the contacts and the motor 38 deenergized. In this position of the thermostat the valve will "float" at some intermediate position and allow just enough steam to enter coil 35 to heat the air to a temperature determined by the setting of the heat exchanger thermostat.

The operation when the heat exchanger thermostat is set to maintain a temperature higher than room temperature is essentially the same as that described above. The only difference is that the heat exchanger thermostat may or may not be in engagement with contact 101 when the room thermostat calls for heat. If it is in engagement with contact 101 or in an intermediate position the operation is the same as that previously described because of the fact that the room thermostat operates the motor in a valve opening direction irrespective of the position of the heat exchanger thermostat. If it is in engagement with contact 103 before the room thermostat calls for heat it is obvious that the opening winding of motor 38 would be energized and valve 37 would be operated to its open position. The circuit is the same as that described above when the same conditions exist. Then, when the room thermostat calls for heat, the operation of switch 95 from engagement with contact 96 into engagement with contact 97 will have no immediate effect on motor 38 since it merely substitutes a circuit comprising conductor 100 for the circuit previously existing through conductor 99 and the thermal element 102 but it will maintain the motor energized after the element moves out of engagement with contact 103.

The operation of the humidity control will next be described. An inspection of the drawing will reveal that the solenoid 34 and humidostat 43 controlling the flow of water to the humidifier are connected in parallel with relay 91 so that the humidity control can be energized only during those periods in which heating medium is called for by the room thermostat i. e., when relay 91 is energized. In addition, it is obvious that the humidostat 43 must be in such position as to close the contact across conductors 87 and 92 before solenoid 34 can be energized. When the humidostat does interconnect these conductors then the solenoid 34 is energized through a circut which is as follows: supply wire 45, conductor 58, switch 55 in engagement with contact 57, conductor 82, switch 83 in engagement with contact 89, conductor 90, solenoid winding 34, conductor 92, humidostat 43 in its closed position, conductor 87 and conductor 88 leading to supply wire 44. Energization of the winding 34 effects operation of the valve through operation of its associated lever against the bias of the spring connected thereto. After the humidity within the space 10 has been raised to the predetermined desired value, the humidostat 43 moves into the position indicated in the diagram to open the energizing circuit for relay 34 and, consequently, the supply of water to the humidifier is terminated by closure of valve 32. However, if the predetermined desired temperature is obtained in the room before the humidity reaches the desired value, then the operation of the humidifier is stopped by the room thermostat.

It should be obvious from the above described operation that the supply of heating medium to the heating apparatus of the conditioner is under the joint control of the two thermal responsive means, one positioned in the conditioner and the second positioned in the space being conditioned. The latter, according to my invention, is also adapted to control the operation of the cooling means and the control I have described above is so arranged that when cooling is selected this is accomplished. Furthermore, the control is such that the heat exchanger thermostat is prevented from exerting any control function when cooling is selected. This is accomplished by the cooperative action of relays 85 and 91. It has been observed that when heating is selected, the relay 85 is adapted to be energized and through operation of its switch 84 to place the control of the motor 38 under the control of the room thermostat and the heat exchanger thermostat. On the other hand, when cooling is selected the relay 85 is deenergized and switch 84 moved into engagement with contact 93. One effect of this operation is to prevent the room thermostat from further controlling the heating medium supply and a second is the closing of a circuit to operate the valve motor to close the valve if the latter is in its open position when cooling is selected. This circuit extends through conductor 111, switch 84 in engagement with contact 93, conductor 98, limit contact 104 and limit switch 106 in engagement therewith (this being the condition thereof when valve 37 is open), conductor 113 to the closing winding of the motor and thence through conductor 112 back to the transformer.

When cooling is selected the fan motor will be energized through the continued energization of relay 71, as has been previously described. At this time switch 62 is adapted to close a circuit across contacts 66 and 68 to place the relay 78 under the control of the room thermostat. It will be noted that the cooling control is such that the fan must be in operation before the relay 78 can be energized. This is desirable because of the fact that undesirable consequences may result if the cooling system is operated when there is no circulation of air by the evaporator.

If the temperature within the room is above a predetermined maximum value thermal responsive element 49 will be in engagement with contact 51, thus effectively short circuiting relay 52. In consequence thereof, switch 55 will be in engagement with contact 56 and if the fan be in operation relay 78 will be energized to place the compressor in operation, the energizing circuit for the relay being as follows: from supply conductor 45 through conductor 58, switch 55 in engagement with contact 56, conductor 59, contact 68, switch 62, contact 66, conductor 76, switch 75 in its closed position, conductor 77 to the relay winding 78 and thence through one of the conductors 79 to the other supply conductor 44. Energization of the relay effects operation of switch 80 and consequent operation of the refrigerating apparatus. The latter, as is well known to those skilled in the art cools the air to some value determined by the characteristics of the apparatus forming the cooling means. When the space has been cooled to a predetermined minimum value, the relay 52 is energized to effect operation of switch 55 into engagement with contact 57. Thus, deenergization of relay 78 terminates operation of the refrigerating apparatus until such time as the room temperature again rises above a predetermined maximum value, when the operation above described will be repeated.

What I claim as new and desire to secure by Letters Patent of the United States, is:

1. In an arrangement for supplying conditioned medium to a space, the combination including heating means, cooling means, means for selecting either of said means for operation, thermal responsive means located in said space and operable above a predetermined temperature for effecting operation of the cooling means when the cooling means is selected for operation and operable below said predetermined temperature for effecting operation of the heating means when the heating means is selected for operation, and means including second thermal responsive means located adjacent the heating means and operable at temperatures independent of said predetermined temperature for separately controlling the heating means when the temperature of said space thermal responsive means is above said predetermined value and said heating means is selected for operation.

2. In a system for supplying conditioned air to a space, the combination of air circulating means, means for cooling the circulated air, means for heating the circulated air including a motor operated valve for controlling the supply of a heating medium to the air heating means, manually operable selective means for starting continuous operation of said air circulating means and selecting either said heating or cooling means for operation, a two-position thermostat located in said space and interconnected with said selective means to effect opening operation of said valve in one position thereof and starting operation of said cooling means in the other position thereof, a second two-position thermostat located adjacent the air heating means and interconnected with said selective means and said first thermostat to control both opening and closing operation of said valve when said first thermostat is in said other position and operation of said heating apparatus is selected and control means independent of both said thermostats for closing said valve when said cooling means is selected for operation.

3. In a system for supplying conditioned air to a space, the combination including electric motor operated air circulating means, electric motor operated means for cooling the circulated air, electric motor operated means for heating the circulated air, and control means therefor including a manually operable selective switch having different positions for selecting said heating and cooling apparatus for operation, a relay controlled by said selective switch for starting operation of said air circulating means in each of said different positions, a two-position thermostatic switch located in said space, a relay having electrical connections jointly controlled by said selective switch and said thermostatic switch in one position thereof for starting operation of said cooling apparatus, a relay having electrical connections jointly controlled by said selective switch and said thermostatic switch in the other position thereof for starting operation of said heating apparatus, a second two-position thermostatic switch located adjacent said heating apparatus and eletcrical connections jointly controlled by said selective switch, said first thermostatic switch in said one position thereof and said second thermostatic switch for controlling the operation of said heating apparatus in accordance with the temperature adjacent thereto.

4. In combination, means for circulating air into a space, means operable for heating the circulated air, means for selecting said circulating means for separate operation and for selecting said heating means for joint operation with said circulating means, a thermostat located adjacent said heating means and having means controlling the operation of said heating means to maintain the circulated air temperature between predetermined limits, a thermostat located in said space and having means for controlling said heating means to increase the temperature of the circulated air above said limits and means controlled by said selective means for stopping operation of said heating means independently of the control of both said thermostats when separate operation of said air circulating means is selected.

5. In combination, means for circulating the air into a space, means including a heat exchange device and a valve for controlling the supply of a heating medium to said device for heating the circulated air, means for selecting said circulating means for separate operation and for selecting said heating means for joint operation with said air circulating means, a thermostat located adjacent said heat exchange device and having means for controlling the opening of said valve to maintain the circulated air temperature between predetermined limits, a thermostat located in said space and having means for opening said valve to increase the temperature of the circulated air above said limits, and means controlled by said selective means for closing said valve independently of the control of both said thermostats when said air circulating means is selected for separate operation.

6. In an air conditioning system, the comtbination including means for circulating air from one space to another space, means operable for heating the air in said one space, means operable for cooling the air in said one space, means responsive to variations in the temperature of the air in said one space, means responsive to variations in the temperature of the air in said other space, means selectively operable into different positions for rendering said other space temperature responsive means effective to control separate operation of said heating means in one position thereof and separate operation of said cooling means in another position thereof when the temperature of the air in said other space is respectively below and above a predetermined value, and means jointly controlled by said selective means and said other space temperature responsive means for rendering said one space temperature responsive means effective to control separate operation of said heating means to maintain the temperature of the air in said one space at a predetermined value only when said other space thermostatic means is selected for control of said heating means and the temperature in said space is above said predetermined value.

7. In combination, an air conditioning apparatus having means operable for heating the air, means separately operable for cooling the air, and means operable for supplying the heated or cooled air to a space to be conditioned, means responsive to variations in the temperature of the air in said space from a predetermined value, separate means responsive to variations in the temperature of the air in said air conditioning apparatus from a predetermined value, and selective means having control connections for rendering said air supply means effective for supplying air to said space and for simultaneously rendering said space temperature responsive means effective selectively to control the separate operation of said heating means and said cooling means to maintain the temperature of the air in said space respectively above and below said predetermined value, and control means under the joint control of said selective means and said space temperature responsive means for rendering said separate temperature responsive means effective to control operation of said heating means to maintain the temperature of the air in said conditioning apparatus at said predetermined value only when said heating means is selected for control by said space temperature responsive means and the temperature in said space is above said predetermined value.

8. In an air conditioning system, the combination including air heating means, air cooling means, means for circulating the heated or cooled air to a space to be conditioned, selective means having different positions for selecting said heating and cooling means for operation, a thermostat operable between two positions in response to variations in the temperature of the air in said space and interconnected with said selective means for starting operation of the heating means in one position thereof and the cooling means in the other position thereof, and means responsive to the temperature of the air adjacent said heating means and interconnected with said selective means and said thermostat for separately controlling the operation of said heating means when said heating means is selected for operation and said thermostat is in the cooling means starting position.

9. In an air conditioning system the combination including air heating apparatus, air cooling apparatus, means for circulating the heated or cooled air to a space to be conditioned, means for starting continuous operation of said air circulating means and selecting either of said apparatus for operation, a thermostat operable between two positions in response to variations in the temperature of the air in said space and interconnected with said selective means for controlling the operation of the apparatus selected and provided with means for starting operation of said heating means in one position thereof and said cooling means in the opposite position thereof, a second thermostat responsive to the temperature of the air adjacent said heating apparatus and interconnected with said selective means and said first thermostat for separately controlling the operation of said heating apparatus when the heating apparatus is selected for operation and said first thermostat is in the cooling apparatus starting position, and means controlled by said selective means for stopping operation of said heating apparatus independently of the control of said first and second thermostats when said cooling means is selected for operation.

10. In an air conditioning system, the combination including means for circulating air from one space to another space, means for heating the air in said one space, said means having a valve for admitting heating medium thereto, means operable for cooling the air in said one space, means responsive to variations in the temperature of the air in said one space, means responsive to variations in the temperature of the air in said other space, means selectively operable into different positions for rendering said other space temperature responsive means effective to control both the opening and closing of said valve in one position of said selective means and to start and stop separate operation of said cooling means in another position of said selective means in accordance with predetermined variations in the temperature of the air in said other space, and means jointly controlled by said selective means and said other space temperature responsive means for rendering said one space temperature responsive means effective to control both opening and closing of said valve to maintain the temperature of the air in said one space at a predetermined value only when said heating means is selected for control by said other space thermostatic means and the temperature in said space is above said predetermined value, and means controlled solely by said selective means for closing said valve when said cooling means is selected for operation.

HARRY R. CRAGO.